Feb. 21, 1967  E. C. HOPKINSON ET AL  3,305,684
NEUTRON SOURCE HAVING MONITOR SYSTEM
FOR ADJUSTING CORONA CURRENT
Filed Jan. 10, 1964  2 Sheets-Sheet 1

INVENTORS
ERIC C. HOPKINSON
ARTHUR H. YOUMANS
BY
E. F. Bard
ATTORNEY

INVENTORS
ERIC C. HOPKINSON
ARTHUR H. YOUMANS
BY
*E. F. Bard*
ATTORNEY

United States Patent Office 3,305,684
Patented Feb. 21, 1967

3,305,684
NEUTRON SOURCE HAVING MONITOR SYSTEM FOR ADJUSTING CORONA CURRENT
Eric C. Hopkinson and Arthur H. Youmans, Houston, Tex., assignors to Dresser Industries, Inc., Dallas, Tex., a corporation of Delaware
Filed Jan. 10, 1964, Ser. No. 336,920
3 Claims. (Cl. 250—84.5)

This invention relates to improved methods and apparatus for producing neutrons, and more particularly relates to novel methods and apparatus for stabilizing the output of a static atmosphere ion beam accelerator in apparatus for radioactivity well logging.

Methods and apparatus which utilizes sources of radiation in well logging are now well known in the oil and gas industry. Such methods and apparatus for radioactivity well logging involve generally the use of a source of radiations, such as neutrons or gamma rays, for bombarding the substances surrounding the well bore, and also involve the use of detection apparatus for measuring one or more characteristics of the radiations which penetrate the well bore as a result of such bombardment.

Initially, all such radioactivity well logging methods and apparatus used encapsulated quantities of substances such as radium, or radium and beryllium, as sources of radiation. However, artificial sources of neutrons and gamma rays, such as those described in U.S. Patent No. 3,071,690, have been found to be more useful in well logging, since sources of this character produce higher energy radiation, and since they may be activated and inactivated as desired.

It has been found that static atmosphere ion accelerators are particularly subject to adverse conditions of environment which are usual in boreholes which extend miles below the surface of the earth. Moreover, it is difficult to deliver a constant flow of electrical energy, over such a long cable, to power these sources. Consequently, the neutron or gamma ray outputs of these accelerators is often erratic and fluctuating during operation in the borehole, and the logging measurement has accordingly suffered with respect to both accuracy and reliability. Various methods and apparatus have been proposed for the purpose of stabilizing the radiation of such devices, and substantial improvements have been made in their design and operation. However, none of these proposals and improvements have efficiently solved the problem, since they all require an appreciable time interval to overcome and to achieve recovery from fluctuations in radiation output.

These disadvantages of the prior art are overcome with the present invention, and novel methods and appartus are provided which effectively stabilize the radiation output of a static atmosphere ion beam accelerator.

Accordingly, it is an object of the present invention to provide novel methods and apparatus for stabilizing the output of a static atmosphere ion beam accelerator.

It is further an object of the present invention to provide novel methods and apparatus for rapidly stabilizing the output of a static atmosphere ion beam accelerator during intervals wherein the output is subject to abrupt fluctuations in magnitude.

It is also an object of the present invention to provide novel methods and apparatus for rapidly stabilizing the output of a static atmosphere ion beam accelerator during operation of such accelerator in a manner to provide radiation pulses at a preselected high frequency of pulsation.

It is a specific object of the present invention to provide novel methods and apparatus for monitoring the radiation output of a static atmosphere ion beam accelerator having means for developing a corona current in relation to the accelerating voltage, and for adjusting the magnitude of the corona current in accordance with the magnitude of such radiation output.

These and other objects and features of the present invention will be apparent from the following detailed description, wherein reference is made to the figures of the accompanying drawings:

Figure 1:
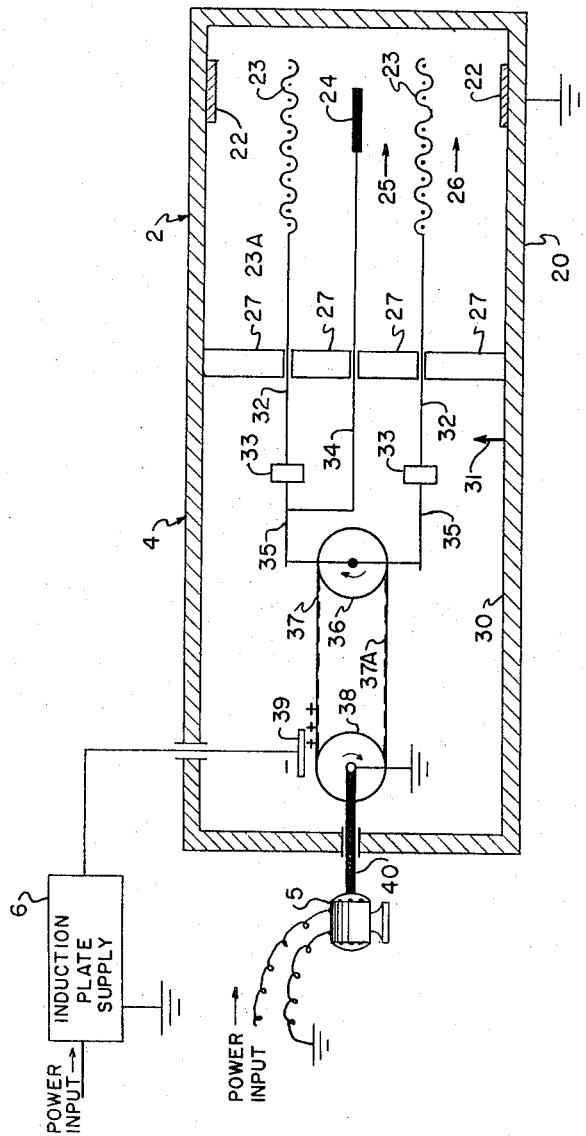
FIGURE 1 shows a schematic representation of a typical static atmosphere ion beam accelerator incorporating a corona current as a means for stabilizing the magnitude of the accelerating voltage in such accelerator.

Referring now to FIGURE 1, there is depicted in schematic form a typical static atmosphere ion beam accelerator, together with other essential apparatus for providing radiation. The composite radiation source may be considered to basically include an accelerator tube 2 coupled to a high voltage power supply. In FIGURE 1, the high voltage power supply is shown schematically as a Van de Graaff generator 4, a motor 5, and an induction plate supply 6. The accelerator tube 2 may employ either the deuterium-deuterium or the deuterium-tritium reactions for producing neutrons, or it may be adapted to produce high energy gamma rays by means of the lithium-proton reaction. However, for purposes of illustrating the operation of the present invention, the accelerator tube 2 may be considered to employ the deuterium-tritium reaction in the manner disclosed in U.S. Patent No. 2,689,918 which issued September 21, 1954 to A. H. Youmans.

Accordingly, the accelerator tube 2 is composed of a gas-tight jacket 20 which encloses a substantially pure deuterium atmosphere 21 at a very low pressure. Disposed generally at the axial center of the accelerator tube 2 is an ionization supply composed of an anode 24 preferably having the form of a single wire, and a surrounding cathode 23 having ganerally the form of a fine wire mesh of screen cylindrically positioned at one end of supporting tube 23A. Mounted on the inside of the jacket 20 is a ring or belt-shaped target 22 which is generally formed of a thin strip of a tritium-impregnated metal such as titanium or zirconium.

Figure 2:
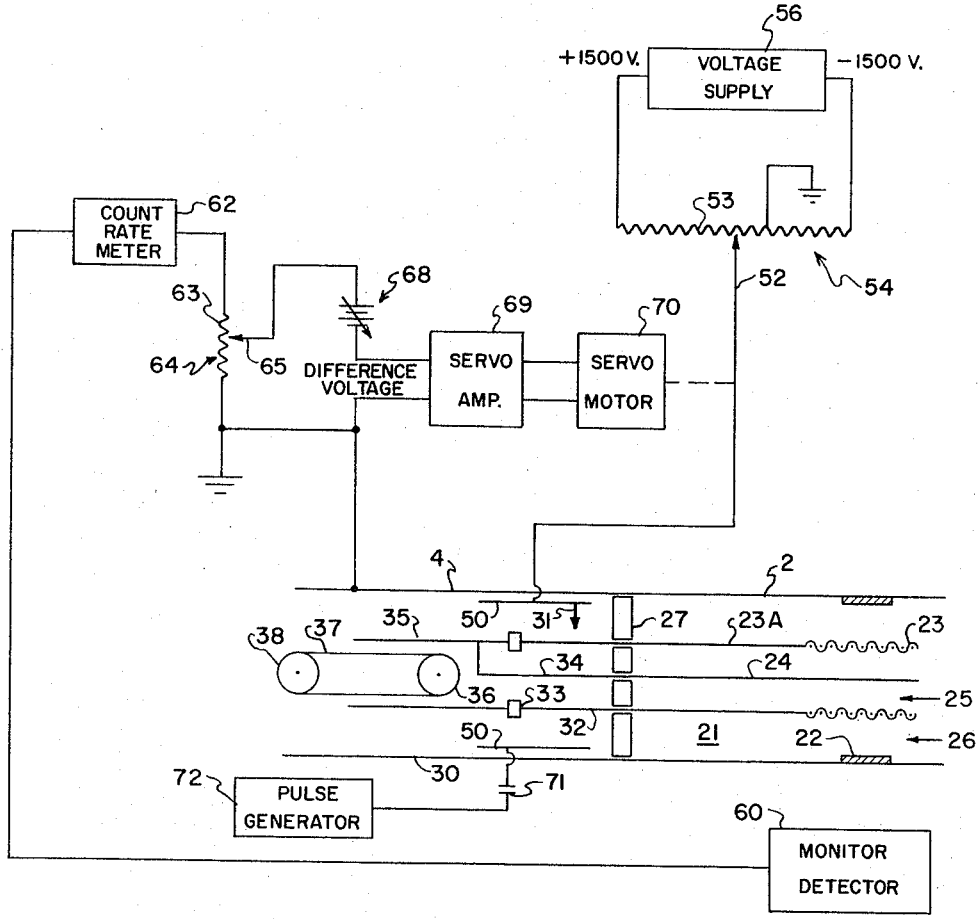
FIGURE 2 shows a schematic representation of the accelerator depicted in FIGURE 1, wherein one form of the present invention is provided for stabilizing the radiation output produced by such accelerator.

The Van de Graaff generator 4 is composed of a tank 30 which is electrically connected to jacket 20 through ground and which is adapted to house a so-called "upper" pulley 38 and a "lower" pulley 36. The two pulleys are arranged to drive a continuous belt 37, which is formed of a non-conductive material such as leather or cloth, but which contains small, regularly sized and spaced segments 37A of a conductive substance mounted thereon as shown in FIGURE 2. The upper pulley 38 may be connected, for rotation purposes, to the motor 5 by means of a drive-shaft 40 or some other suitable linking means. Near the lower pulley 36 there is arranged a two-section electrode assembly hereinafter referred to as the upper hollow electrode 35 and the lower hollow electrode 32. As functionally represented in FIGURE 2, the upper hollow electrode 35 is connected by means of conductor 34 to the anode 24 in the accelerator tube 2, and the lower hollow electrode 32, which is insulated from the upper hollow electrode 35 by means of an insulator 33, is connected through an insulating socket 27 to the cathode 23.

The induction plate supply 6 shown in both FIGURE 1 and FIGURE 2 is interconnected to apply a high negative voltage to the induction plate 39 to cause the upper pulley 38 to become positively charged in response thereto. When the motor 5 is caused to rotate the upper pulley 38, the continuous belt 37 is caused to carry the positive charge on the aforementioned segments 37A of conductive substance from the upper pulley 38 to the lower pulley 36. From the lower pulley 36 the positive charge is conducted to the anode 24 by means of the lower hollow electrode 35 and the conductor 34. Thus, the anode 24 is caused to become increasingly positively charged, by the operation of the Van de Graaff generator 4, with respect to both the cathode 23 and the target 22. However, when the charge born by the anode 24 reaches a certain magnitude, there develops an electron flow through ionization region 25 between the cathode 23 and the anode 24 which serves to ionize the deuterium of atmosphere 21 contained therein. These positively charged ions are attracted towards and through the relatively negatively charged cathode 23 and, due to the high potential established between the highly positively-charged anode 24 and the grounded target 22, are accelerated across the so-called "accelerating gap" 26 into the tritium-impregnated target 22. When the accelerator tube 2 is operated properly, these accelerated deuterium ions will bombard the tritium nuclei in the target 22 at velocities such as to produce high energy neutrons in substantial numbers.

In addition to the "beam current" (ion flow) across the accelerating gap 26, there may also be developed, in generators of the type herein depicted, a "corona current" between the lower hollow electrode 32 and the Van de Graaff generator tank 30. Since the lower hollow electrode 32 is not only electrically isolated from the upper hollow electrode 35, but is also isolated from "ground," the potential at the lower hollow electrode 32 rises with respect to "ground" during the aforementioned ionization of the deuterium atmosphere 21 within the ionization region 25, until a current flow develops between the lower hollow electrode 32 and either the jacket 20 of the accelerator tube 2, or the tank 30 of the generator 4, or both. Thus, in order to achieve stability of the "beam current" a sharp pointed electrode, which is hereinafter referred to as the "corona point" 31, is preferably adjustably disposed within the tank 30 at a location opposite the lower hollow electrode 32. Since the gap between the lower hollow electrode 32, and the corona point 31, is narrower than between the lower hollow electrode 32 and any other grounded point in the generator 4, all of the leakage current flow between the lower hollow electrode 32 and "ground" (except for the beam current) will be developed across this "corona gap" between the corona point 31 and the adjacent section of the lower hollow electrode 32. As is well known in the art, it is an inherent characteristic of any corona current that current flow is negligible until the voltage is brought to a certain magnitude Vc, but that voltage increases above Vc develop increasingly large magnitudes of current. Thus, if the voltage established across the "corona gap" is substantially greater than Vc, fluctuations in current flow between the corona point 31 and the lower hollow electrode 32 will produce only relatively slight fluctuations in the voltage established across the "corona gap." Since the corona voltage is equal to the accelerating voltage across the accelerating gap 26 because corona point 31 and target 22 are electrically connected to one another through ground and thus are at the same potential. Since cathode 23 and lower hollow electrode 32 are also of the same potential the voltage across accelerating gap 26 is thereby effectively stabilized.

There is disclosed in the copending application by Eric C. Hopkinson, Serial Number 141,823, filed September 29, 1961, now Patent No. 3,176,136, methods and apparatus for stabilizing the output of the accelerator tube 2 by regulating the speed of the belt 37 and the output of the induction plate supply 6. Such methods and apparatus are particularly useful when variations in radiation output are due to variations in the purity and density of the deuterium atmosphere 21, and in the concentration of tritium in the target 22, since these variations tend to be relatively gradual. However, rapid fluctuations will often occur in the magnitude of the potential established across the accelerating gap 26, and in the magnitude of the current flowing to the anode 24, and unless these rapid fluctuations are rapidly compensated for, or corrected, the radiation output will substantially diminish or disappear completely during the time required for the system to recover.

Referring now to FIGURE 2, there may be seen a more simplified version of the accelerator tube 2 and Van de Graaff generator 4, including the anode 24 and cathode 23 in the accelerator tube 2, and including the belt 37, pulleys 36 and 38, and upper and lower hollow electrodes 32 and 35 in the Van de Graaff generator 4. It will be noted that the corona point 31 is mounted on a corona electrode 50, instead of on the wall of the tank 30, as indicated in FIGURE 1. Furthermore, the corona electrode 50 is insulated from the tank 30, and is connected to the wiper 52 of a servo-driven potentiometer 54 which has its resistance 53 grounded in the center. The resistance 53 is also connected across a suitable voltage supply 56. In FIGURE 2, the voltage supply 56 is indicated as developing voltages within the range of ±1500 volts, which range has been found satisfactory for many purposes. However, the range may be different depending upon the variations in the design of the accelerator tube 2 and Van de Graaff generator 4.

The output of the accelerator tube 2 is measured by means of a monitor detector 60 which is preferably positioned near or adjacent the target 22. The detector 60 may be of a type which is sensitive to either gamma rays, neutrons, or alpha particles, depending upon the character of the nuclear reactions produced within the accelerator tube 2, and its output is applied directly to a count rate meter 62 which is adapted to develop a voltage across the resistance 63 of a range potentiometer 64 at a magnitude related to the rate at which radiations are sensed by the monitor detector 60. The wiper 65 of the range potentiometer 64 is connected to the positive side of a reference voltage supply 68, which may be a battery, and which has its negative side or terminal connected to a servo amplifier 69. The opposite end of the resistance 63, and the other terminal of the servo amplifier 69 are connected to ground. Accordingly, a difference voltage is applied to the servo amplifier 69 which is dependent upon the position of wiper 65 on resistance 63, and upon the voltage developed across resistance 63 by the count rate meter 62. Consequently, the servo motor 70 acts to drive wiper 52 according to the output of the accelerator tube 2 and according to the position of wiper 65.

In operation of the neutron source, the system is preferably calibrated so that during optimum output of the accelerator tube 2, wiper 52 should be positioned substantially at zero, and wiper 65 should be positioned to develop substantially a zero difference voltage across the servo amplifier 69. Accordingly, the servo motor 70 should then be adjusted to drive the corona point 31 more negative when the difference voltage is adjusted negatively by an increase in radiation output from the accelerator tube 2. An increase in radiation output will, of course, drive the corona point more positive. An increase in the potential between the corona electrode 50 and the upper hollow electrode 32 will produce a drop in the accelerating voltage across the accelerating gap 26. A decrease in radiation output will modulate the voltage on the corona point 31 in a sense that the potential across the corona electrode 50 is reduced, and accordingly the corona current will diminish. If the corona current diminishes, however, the accelerating voltage will rise. As is well known, a one percent change in accelerating voltage will produce about a three percent change in radiation output from the accelerator tube 2. Thus, by varying the voltage on the corona electrode 50 through a 3000-volt range, the radiation output can be rapidly varied within a ten percent range.

It is often desirable to operate the accelerator tube 2 to produce bursts or pulses of radiation, rather than in a steady constant manner. Although stability of output is somewhat less important when the accelerator tube 2 is operated to produce radiation intermittently, if the radiation pulses are to be produced at a very high frequency and at a steady rate, then stability becomes more important. Accordingly, it may be desirable to connect the pulse generator 72 to the corona electrode 50, through a capacitance 71, in order that voltage variations on the corona electrode 50 due to the operation of the pulse generator 72 may be reconciled with changes in the corona voltage which are provided by adjustments in the position of wiper 52.

In the drawings, the present invention is shown in its preferred form as a corona current flowing to an electrode having a potential other than ground, together with means for controlling the magnitude of the potential on the electrode. Clearly, the present invention is not limited to a corona current, since any type of stabilizing load may be used in lieu of the corona current, wherein a current flows through the load to ground, wherein the low voltage end of the load is established at a potential other than ground, and wherein the control means operates to vary that potential.

Numerous other modifications and variations of the present invention may be made without departing from the scope and essence of the operations hereinbefore described. Accordingly, it should be clearly understood that those forms of the invention depicted in the accompanying drawings, and described herein, are illustrative only and are not intended to limit the scope of the present invention.

What is claimed is:

1. In a source or radiation comprising an accelerator tube and an electrostatic generator, said accelerator tube including
    a static atmosphere substantially composed of at least one isotope of hydrogen,
    ionizing means arranged in said atmosphere, and
    a grounded target;
    said generator including
    an endless rotatable belt,
    means for developing an electric charge on said belt at a first location,
    a collector electrode for receiving said electric charge from said belt at a second location and applying said charge to said ionizing means in said accelerating tube, and
    a grounded tank insulated from said collector electrode and housing said generator;
    the improvement in combination therewith including
    a radiation detector arranged in close proximity to said accelerator tube for providing a first signal composed of electric pulses representative of radiations incident on said detector,
    means responsive to said first signal for developing a second signal having a magnitude substantially proportional to the rate of occurrence of said pulses composing said first signal,
    a corona electrode mounted in said generator between said tank and said collector electrode,
    a corona point mounted on said corona electrode to develop a corona current between said corona point and said collector electrode, and
    control means for varying the magnitude of said corona current in response to variations in the magnitude of said second signal.

2. The improvement described in claim 1, including a source of voltage pulses connected to said corona electrode.

3. The improvement described in claim 1, wherein said control means comprises
    a voltage signal responsive to said second signal for establishing a difference voltage relative to the magnitude of said second signal,
    a variable voltage supply connected to said corona electrode and having a null point, and
    a servo motor responsive to said difference voltage for varying the output of said voltage supply with respect to said null point.

References Cited by the Examiner
UNITED STATES PATENTS

| | | | |
|---|---|---|---|
| 2,960,610 | 11/1960 | Gale | 250—84.5 |
| 2,994,776 | 8/1961 | Mott | 250—84.5 |
| 3,104,322 | 9/1963 | Gale et al. | 250—84.5 |

RALPH G. NILSON, *Primary Examiner.*

S. ELBAUM, *Assistant Examiner.*